United States Patent
Grothues et al.

(10) Patent No.: US 10,661,212 B2
(45) Date of Patent: May 26, 2020

(54) FILTER ELEMENT

(71) Applicant: Clear Edge Filtration CFE GMBH, Salzgitter-Calbecht (DE)

(72) Inventors: Alexander Grothues, Zeiskam (DE); Detlef Hega, OT Harriehausen (DE)

(73) Assignee: CLEAR EDGE FILTRATION CFE GMBH, Salzgitter-Calbecht (DE)

( * ) Notice: Subject to any disclaimer, the term of this patent is extended or adjusted under 35 U.S.C. 154(b) by 231 days.

(21) Appl. No.: 15/525,911

(22) PCT Filed: Nov. 9, 2015

(86) PCT No.: PCT/EP2015/076035
§ 371 (c)(1),
(2) Date: May 10, 2017

(87) PCT Pub. No.: WO2016/075069
PCT Pub. Date: May 19, 2016

(65) Prior Publication Data
US 2017/0312675 A1    Nov. 2, 2017

(30) Foreign Application Priority Data

Nov. 10, 2014   (GB) .................................. 1419989.7

(51) Int. Cl.
*B01D 46/00* (2006.01)
*B01D 46/24* (2006.01)
*B01D 46/06* (2006.01)

(52) U.S. Cl.
CPC ......... *B01D 46/0005* (2013.01); *B01D 46/06* (2013.01); *B01D 46/2407* (2013.01); *B01D 2265/06* (2013.01); *B01D 2273/20* (2013.01)

(58) Field of Classification Search
CPC ................ B01D 2265/06; B01D 46/24; B01D 46/2403; B01D 46/2407; B01D 46/2411; B01D 46/0005; B01D 46/06; B01D 2273/20
See application file for complete search history.

(56) References Cited

U.S. PATENT DOCUMENTS

| | | | | |
|---|---|---|---|---|
| 2002/0073849 A1* | 6/2002 | Buettner | ............ | B01D 39/1623 95/280 |
| 2012/0279185 A1* | 11/2012 | Appelo | .................. | B01D 46/06 55/378 |
| 2013/0227921 A1* | 9/2013 | Appelo | .................. | B01D 46/02 55/378 |

FOREIGN PATENT DOCUMENTS

| | | |
|---|---|---|
| AU | 1194983 A | 9/1983 |
| EP | 2614871 A1 | 7/2013 |
| JP | 2000-140536 A | 5/2000 |

(Continued)

OTHER PUBLICATIONS

International Bureau of WIPO: International Preliminary Report on Patentability dated May 26, 2017 for PCT/EP2015/076035; 8 pages.

(Continued)

*Primary Examiner* — Robert Clemente
(74) *Attorney, Agent, or Firm* — Schwabe Williamson & Wyatt, PC

(57) ABSTRACT

The present invention relates to a ceramic filter arrangement comprising a ceramic filter and a support housed within the ceramic filter, wherein the support is in contact with inside walls of the ceramic filter.

20 Claims, 5 Drawing Sheets

(56) References Cited

FOREIGN PATENT DOCUMENTS

| | | |
|---|---|---|
| WO | 2005/072848 A1 | 8/2005 |
| WO | 2016/075069 A1 | 5/2016 |

OTHER PUBLICATIONS

International Search Authority: European Patent Office; International Search Report and Written Opinion dated Feb. 9, 2016 for PCT/EP2015/076035; 10 pages.

* cited by examiner

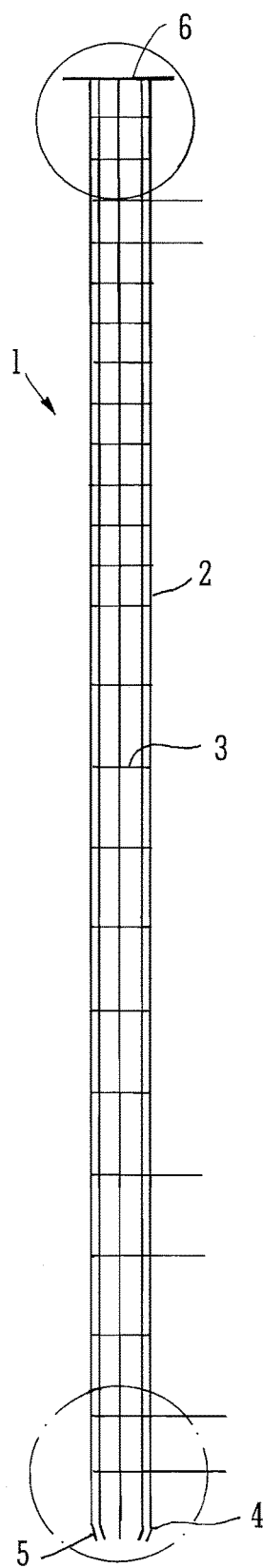
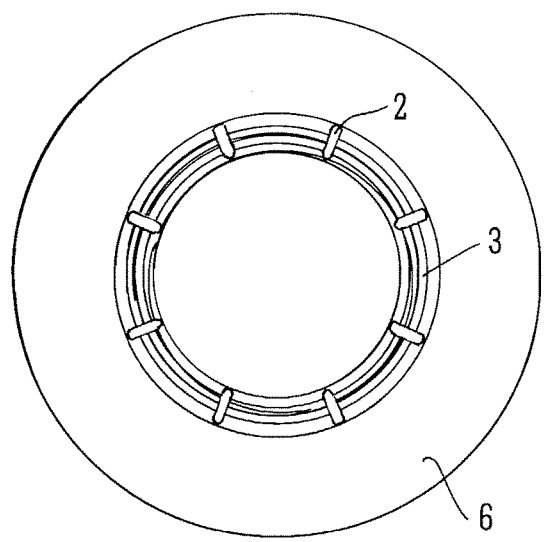
FIG. 1C
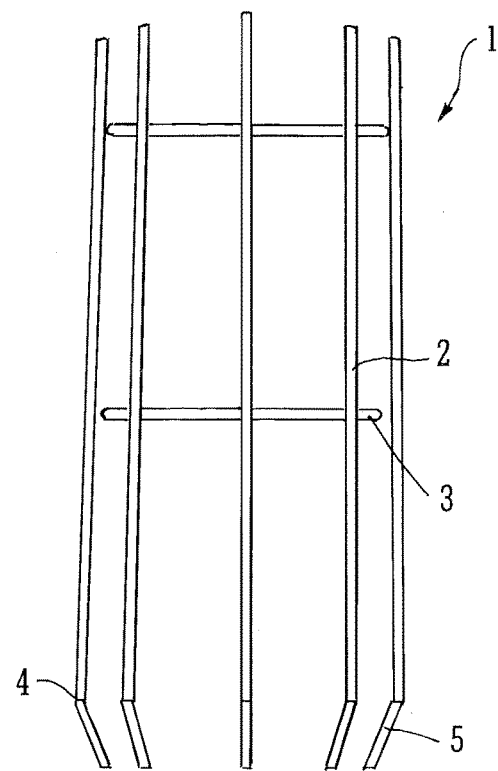
FIG. 1A
FIG. 1B

FILTER ELEMENT

TECHNICAL FIELD OF THE INVENTION

The present invention relates to a ceramic filter arrangement.

BACKGROUND TO THE INVENTION

Ceramic filters are often used instead of traditional textile filter elements to remove particulates from hot gas streams since they exhibit superior filtration characteristics and do not substantially degrade at higher temperatures, being substantially stable at temperatures of up to 1100° C. They often comprise a rigid ceramic tube with a radial flange located at an open end of the filter and may be mounted to a filter housing by securing the radial flange between a flat, planar tube sheet and a clamping plate using a gasket of compressed ceramic fibres to form a seal.

However, it is known that such ceramic filters are brittle and are susceptible to fracture, particularly at the open end near the flange, especially when the filter element has a length dimension of approximately 3 metres or more. This has the drawback that a large piece or pieces of the ceramic filter may fall into a collection hopper containing the filtered particulate matter resulting in contamination of the filtered particulate matter. Contamination of the particulate matter is undesirable, particularly when the particulate matter is valuable, since this may result in the particulate matter having to be discarded and/or the filtering operation being halted while the fractured element is removed from the hopper.

It is known to reinforce ceramic filters with metallic cages, enabling filter elements to withstand much higher lateral loads when clamped in a filter housing. Despite the improvements in lateral strength, ceramic filters may still fracture in the event of an explosion or if large and/or abrasive dust particles impact the ceramic filter. Further, fracture of the ceramic filter may occur as a result of earth tremors, earthquakes and similar natural phenomena.

It is an object of embodiments of the present invention to provide a ceramic filter arrangement that overcomes the above described drawbacks.

According to a first aspect of the invention there is provided a ceramic filter arrangement comprising a ceramic filter and a support housed within the ceramic filter, wherein the support is in contact with the inside walls of the ceramic filter. The support according to the first aspect of the invention has the advantage that the ceramic filter is able to withstand much greater bending movements which minimises the risk that the ceramic filter will fracture. Further, by virtue of the support being in permanent contact with the inside walls of the ceramic filter during use, the support is able to retain the ceramic filter in the event the ceramic filter becomes fractured. This has the advantage that the fractured portion of the ceramic filter does not fall into the hopper containing the particulate matter, thereby preventing contamination of the particulate matter. The support ideally extends substantially along the entire length of the ceramic filter.

The support is not a porous coating layer. It is an arrangement to provide mechanical reinforcement to the rigid self-supporting ceramic filter. The support may comprise a plurality of bars and two or more reinforcing elements spaced along and connected to the bars. Such a support is very suitable for increasing the lateral strength of the ceramic filter. By increasing the lateral strength of the ceramic filter, the risk of fracture is significantly reduced. The support may be in the form of a mesh or in the form of a cage.

The support may comprise between 5 and 15 bars, more preferably between 8 and 12 bars. The support may comprise between 15 and 35 reinforcing elements, more preferably between 20 and 30 reinforcing elements. The reinforcing elements may be in the form of hoops.

The reinforcing elements may be spaced along the bars at intervals ranging between 50 mm and 200 mm and preferably between 75 and 150 mm. It is preferred that a high concentration of reinforcing elements are located at an end of the support closest to the tube sheet to which the ceramic filter connects to. By providing 6 to 14 reinforcing elements, preferably spaced at 50 to 100 mm intervals, additional support is afforded to the ceramic filter at a location where it is most likely to fracture. In contrast, a lower concentration of reinforcing elements may be located at the opposite end of the support. At this end, between 5 and 10 reinforcing elements may be spaced at intervals of more than 100 mm to 200 mm.

The support may comprise a knuckle for making contact with the inside walls of the ceramic filter. In the event that the ceramic filter becomes fractured, the knuckle acts to retain the fractured portion of the ceramic filter such that it does not fall into the hopper containing the particulate matter. Supports comprising one or more knuckles are able to support greater loads relative to supports in which knuckles are absent.

The diameter at the knuckles may be greater than the diameter of the main body of the support. The main body of the support may be defined as the region of the support above the knuckles.

The knuckle may be formed by bending a section of the one or more bars substantially inwards as shown in FIG. 1. This has the advantage that the inwardly extending bar sections exhibit a 'natural spring' that allows easy insertion of the support into the ceramic filter. This also ensures that damage to inside walls of the ceramic filter is minimised. Further, the support comprising knuckles and inwardly extending bar sections is suitable for providing support to ceramic filters having a slight degree of bow, waviness or a variable inner diameter. In addition, the support better accommodates the differential in thermal expansion between the ceramic filter having a low thermal expansion coefficient and the support, typically made of a metallic material, having a high thermal expansion coefficient at elevated temperatures. This is important since the supported ceramic filter may be subjected to a heat treatment of up to 1100° C. in certain instances.

The diameter of the support at the knuckles may be greater than the diameter of the support at the tips of the inwardly extending bar sections.

The support may comprise one or more knuckles at one end of the support, preferably at a support end away from a tube sheet that the ceramic filter connects to. This means that, no matter where a fracture occurs, the broken portion of the ceramic filter will be retained and contamination of the particulate matter is prevented.

By providing each bar, or alternate bars with knuckles, sufficient support is afforded to the ceramic filter in the event it is fractured.

In another embodiment of the invention, one or more knuckles and inwardly extending bar sections may be provided at both ends of the support.

Alternatively, the support may comprise further knuckles which may be welded to the bars.

The support may comprise a secondary support element connected to the support, the secondary support element extending radially from the support for making contact with the inside walls of the ceramic filter. This has the advantage that, in the event that the ceramic filter becomes fractured, the knuckles and the second support element act to retain the fractured portion of the ceramic filter ensuring that the fractured portion of the filter element does not fall into the hopper.

The secondary support element may be releasable from the support. This has the advantage of reducing the complexity of the manufacturing operation when manufacturing the support. In this way, the support and the secondary support element may be manufactured individually and then assembled prior to the support being provided within the ceramic filter.

The support may comprise one or more secondary support elements at one end of the support, preferably at a support end away from a tube sheet that the ceramic filter is connected to. This has the advantage that the secondary support elements are to retain the ceramic filter in the event the ceramic filter becomes fractured, irrespective of where the fracture occurs.

The support preferably comprises at least two secondary support elements. It has been found that a support at least two secondary support elements is very suitable for retaining the ceramic filter if it becomes fractured. For added security, supports comprising four secondary support elements may be used.

The filter is capable of operating at temperatures in excess of 900° C. up to about 1100° C.

It has also been found that secondary support elements comprising blades are particularly suitable for retaining the ceramic filter even when the fracture occurs at the end closest to the tube sheet. This has the advantage that a reduced number of secondary support elements may be used to retain the ceramic filter.

The support may comprise venturi.

The ceramic filter may have a length between 1.0 and 5.0 metres, preferably between 1.5 and 3.0 metres. The support may extend substantially along the length of the ceramic filter. This has the advantage that improvements in lateral strength are obtained along the length of the ceramic filter and not just along part of its length.

The ceramic filter element is not a multi-layered coated construction, but a one piece construction. The support is provided independently to provide additional strength and vibration resistance.

The support may comprise a metallic material such as stainless steel. Supports made of stainless steel are very suitable since they exhibit good corrosion resistance to high temperature gas contaminants that may chemically corrode the support. Alternatively, the metallic material may comprise a coated mild steel.

The secondary support element may also comprise a metallic material such as stainless steel or coated mild steel.

The filter has particular application as a particulate filter from gas. It may be used as a dust filter.

The ceramic filter and the support may be provided in the form of elongate hollow tubes. The filter element may be closed at one end and may carry a radially, outwardly extending flange at an end opposite to the closed end.

The ceramic filter is rigid and self-supporting unlike fabric filters. The support does not give shape and maintain the surface area of the ceramic filter, but provides reinforcement to deal with the results of earth tremors and the like.

According to a second aspect of the invention there is provided method for providing a supported ceramic filter arrangement, which comprises the steps of:
a. providing a ceramic filter;
b. providing a support;
c. providing the support within the ceramic filter so that the support is in contact with inside walls of the ceramic filter.

According to a third aspect of the invention there is provided a support for supporting a ceramic filter, wherein the support comprises a knuckle for making contact with to inside walls of the ceramic filter. The support according to the third aspect of the invention may incorporate any or all of the features described in relation to the support according to first aspect of the invention as desired or as appropriate.

According to a fourth aspect of the invention there is provided a support for supporting a ceramic filter, wherein the support comprises a secondary support element extending radially from the support for making contact with inside walls of the ceramic filter. The support according to the fourth aspect of the invention may incorporate any or all of the features described in relation to the support according to first aspect of the invention as desired or as appropriate.

DETAILED DESCRIPTION OF THE INVENTION

In order that the invention may be more clearly understood an embodiment thereof will now be described, by way of example only, with reference to the accompanying drawings, of which:

FIG. 1A shows a support comprising knuckles and inwardly extending bar sections.

FIG. 1B shows an exploded view of the support comprising knuckles and inwardly extending bar sections.

FIG. 1C shows a plan view of the support.

Figure 2:
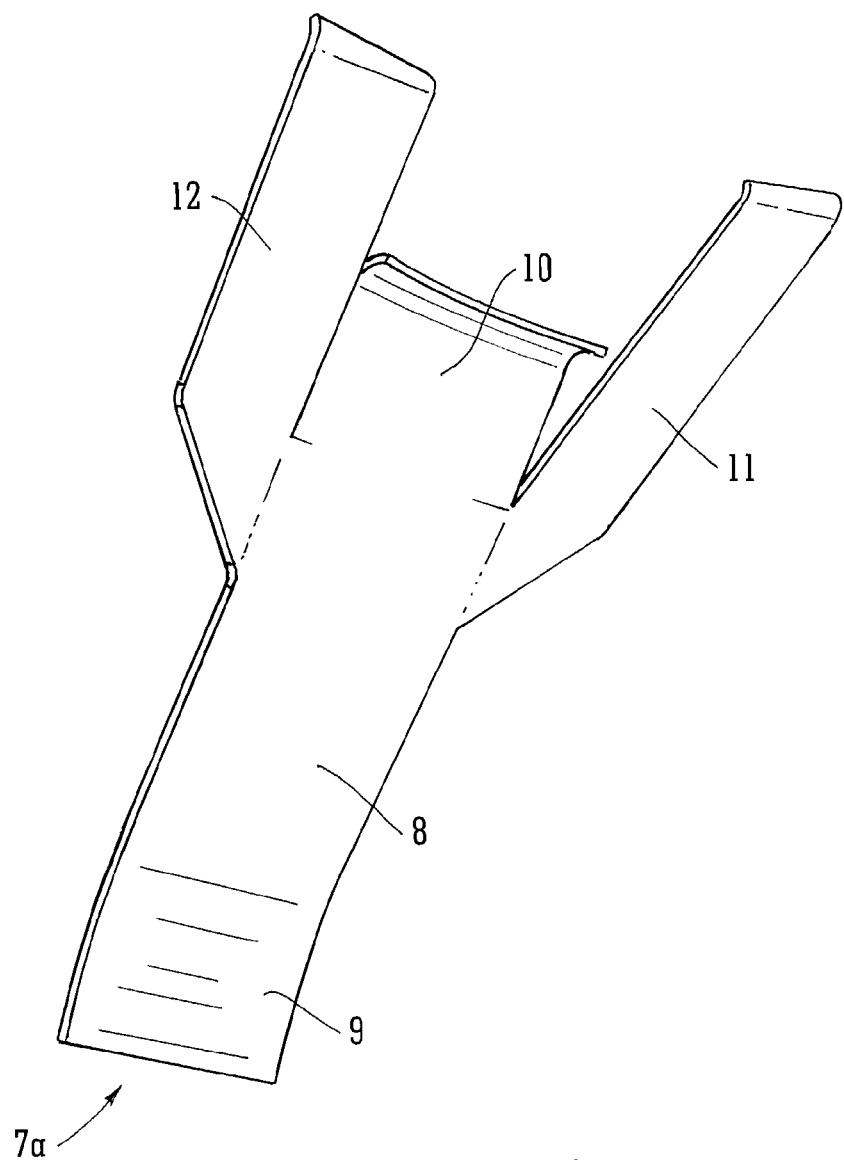
FIG. 2 shows a first design of a secondary support element according to the invention.

FIGS. 1A-C shows a first example of a support (1). The support in the form of a barred enclosure having a length dimension of 2700 mm and a diameter of 100 mm. The support comprises eight vertical bars (2) disposed in a substantially spaced apart cylindrical configuration and reinforcing hoops (3) spaced along and connected to the vertical bars to form a support having a hollow tubular structure. The support comprises 10 reinforcing hoops being spaced apart at 150 mm intervals and 13 reinforcing hoops being spaced apart at 75 mm intervals. The 10 reinforcing hoops spaced apart at 150 mm intervals are located at an end of the support closest to a knuckle (4) and inwardly extending bar sections (5). The distance between the knuckle and the reinforcing hoop closest the knuckle is 100 mm, while the length of the inwardly extending bar section is 25 mm. The 13 reinforcing hoops are located at an end of the support closest to collar (6) to which the support is at least partly housed. By reducing the distance between the reinforcing elements at this end, for instance from 150 mm to 75 mm, additional support is afforded to the ceramic filter where it is most prone to fracture.

According to a second example of the invention, the support having a tubular structure and a length of 1600 mm comprises eight vertical bars (2) and reinforcing hoops spaced apart and connected to the vertical bars. In this example, 6 reinforcing hoops, spaced apart at 140 mm intervals, are located at an end closest the knuckle (4) and the inwardly extending bar sections (5), whereas 7 reinforcing hoops spaced apart at 75 mm intervals are located at an end closest the tube plate away from the knuckle and inwardly extending bar sections. The distance between the knuckle and the reinforcing hoop closest to the knuckle is 100 mm, while the length of the inwardly extending bar section is 25 mm.

In both examples, the diameter of the support at the knuckles is 120 mm, whereas the diameter of the support above the knuckles is 100 mm. Similarly, the diameter at tips of the inwardly extending bar sections is 100 mm.

It has been found that the supports according to example 1 and example 2 are very suitable for retaining the ceramic filter when the ceramic filter is fractured. It was additionally found that the support comprising knuckles could be easily inserted into the ceramic filter without causing damage to the inside walls of the ceramic filter.

FIG. 2 shows a first design of a secondary support element (7a). The secondary support element comprises a substantially rectangular body (8). The rectangular body exhibits a slight s-profile. This is due to the rectangular body being slightly inclined at one end and slightly declined at the other. The inclined end (9) of the body has an outer edge that is adapted for gripping an inside wall of a ceramic filter. The declined end (10) of the body in conjunction with two flaps (11, 12) that extend from each longitudinal edge of the body are used to attach the secondary support element to reinforcing hoops (3).

Figure 3:
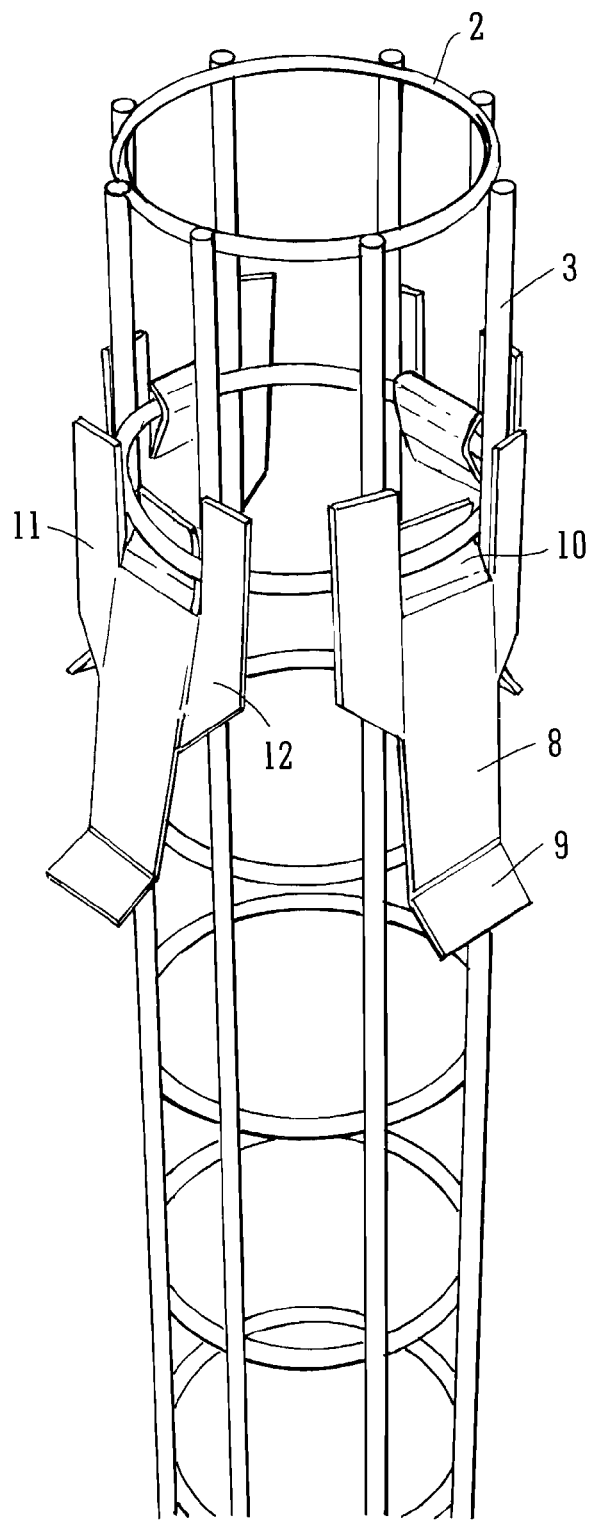
FIG. 3 shows a support comprising primary and secondary support elements

As shown in FIG. 3, the declined end of the body fit inside a hoop (3) of the support. The two flaps remain outside the support and press onto the vertical bars (2). This means that when the secondary support element is fitted, there is enough pressure to retain the secondary support element on the barred enclosure. For further security, the declined end of the body may be bent around the hoop after the secondary support element has been secured to the support, ensuring that the secondary support element cannot be easily removed.

Figure 4:
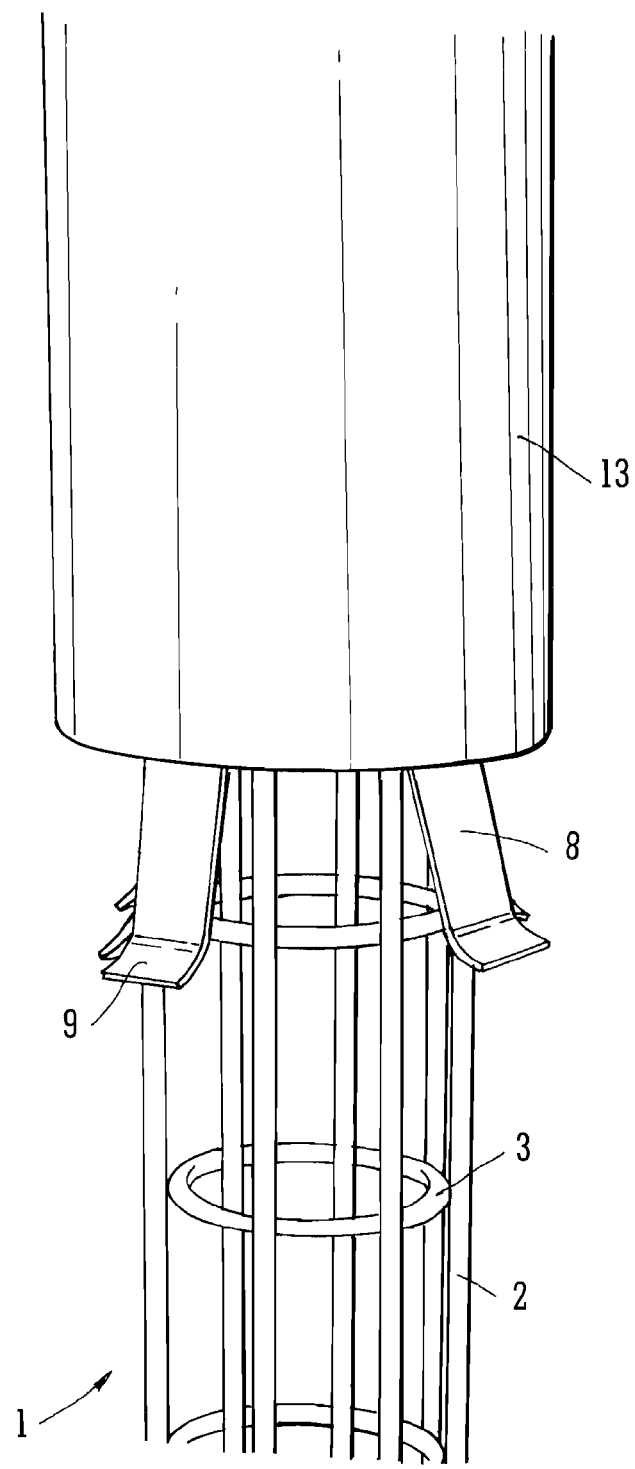
FIG. 4 shows a support comprising primary and secondary support elements being provided within a ceramic filter

FIG. 4 shows a ceramic filter (13), a support (1) in the form of a barred enclosure and secondary support elements (7a) at one end of the barred enclosure. The support is provided inside the ceramic filter by sliding the end comprising the secondary support elements into the ceramic filter first. This means that the rectangular body (8) of the secondary support element enters the ceramic filter before the inclined end (9) of the body. This ensures that damage to the inside walls of the ceramic filter is minimised. Once inside the ceramic filter, the rectangular body, extending axially outwards, causes the inclined end of the rectangular body to press tightly against the inside wall of the ceramic filter, which ensures that the ceramic filter is retained in the event it is fractured.

Figure 5A:
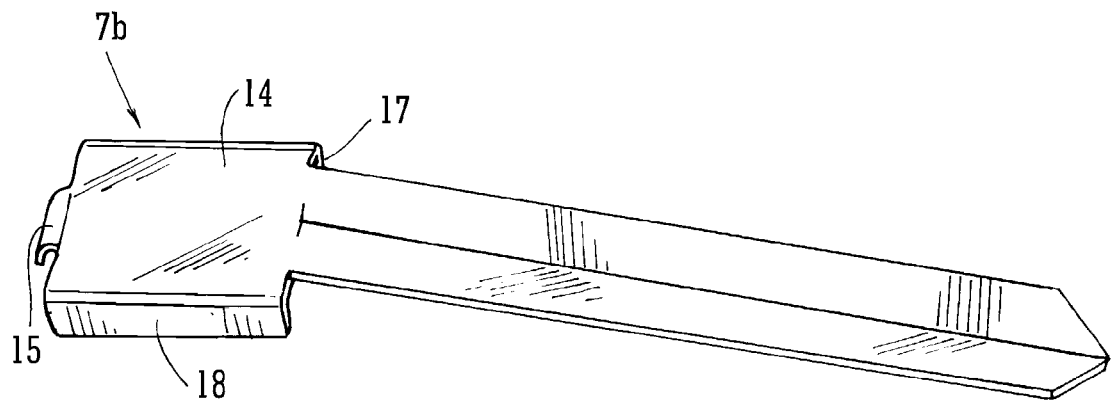
FIGS. 5A and 5B shows a second design of a secondary support element according to the invention.
Figure 5B:
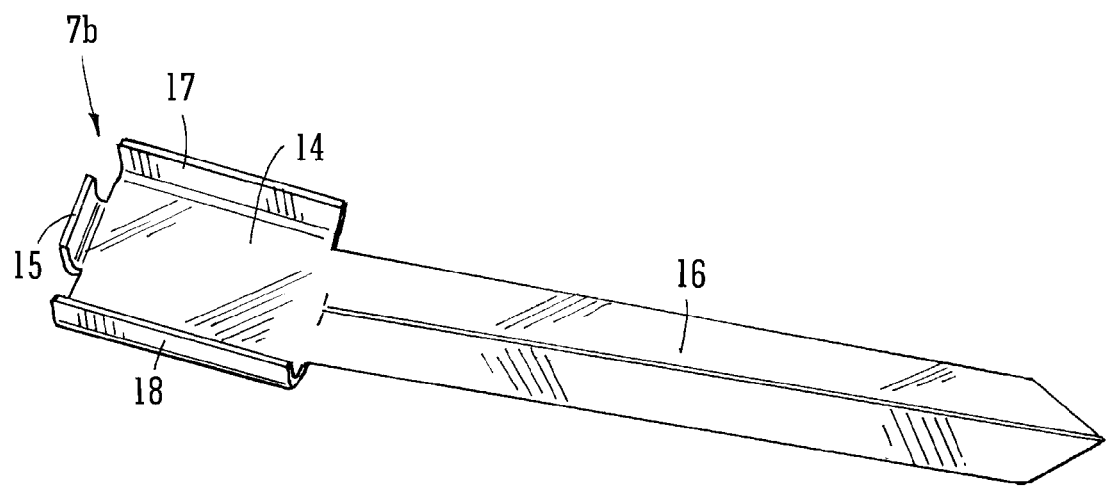

FIGS. 5A and 5B shows a second design of a secondary support element (7b), which comprises a rectangular body (14) having an inclined tab (15) at one end of the body and a blade section (16) at the opposite end that is slightly inclined with respect to the plane of the body. The secondary support element additionally comprises inclined flaps (17, 18) extending along the longitudinal edge of the body. The secondary support element is secured to the support (2) by positioning the secondary support element inside the barred enclosure and bending the inclined tab and inclined flaps around a hoop (3) and vertical bars (2) respectively. This causes the blade section of the secondary support element to extend radially outwards from the barred enclosure.

Any number of secondary support elements (7a) may be attached to the support (1). However, by attaching four secondary support elements at one end of the support and inserting this end of the of the support into the ceramic filter (13) first, the full weight of a ceramic filter was supported when the ceramic filter was fractured, even when the fracture occurred at an end closest to a tube sheet to which the ceramic filter is connected. It was also found that a support comprising two secondary support elements (7b) was sufficient for retaining the ceramic filter and its associated dust cake when the ceramic filter became fractured at the end closest to the tube sheet. This has the advantage that the filtering operation does not have to be halted and the particulate matter to be filtered is not contaminated with ceramic material from the fractured ceramic filter.

The invention claimed is:

1. A ceramic filter arrangement comprising a rigid and self-supporting ceramic filter and a support housed within the ceramic filter and in contact with inside walls of the ceramic filter, wherein the support comprises a knuckle for making contact with the inside wall of the ceramic filter and the diameter of the support at the knuckles is greater than the diameter of the support above the knuckles.

2. A ceramic filter arrangement according to claim 1, wherein the support comprises a plurality of bars and two or more reinforcing elements spaced along and connected to the bars.

3. A ceramic filter arrangement according to claim 1, wherein the knuckle is formed by bending a section of the one or more bars substantially inwards.

4. A ceramic filter arrangement according to claim 1, wherein one or more knuckles are provided at one end of the support.

5. A ceramic filter arrangement according to claim 1, wherein the support comprises a secondary support element connected to the support, the secondary support element extending radially from the support for making contact with the inside walls of the ceramic filter.

6. A ceramic filter arrangement according to claim 5, wherein the secondary support element is releasable from the support.

7. A ceramic filter arrangement according to claim 1, wherein one or more secondary support elements are provided at one end of the support.

8. A ceramic filter arrangement according to claim 1, wherein the support comprises at least two secondary support elements.

9. A ceramic filter arrangement according to claim 6, wherein the support comprises a venturi.

10. A ceramic filter arrangement according to claim 1, wherein the length of the ceramic filter is between 1.0 and 5.0 metres.

11. A ceramic filter arrangement according to claim 10, wherein the length of the ceramic filter is between 1.5 and 3.0 metres.

12. A ceramic filter arrangement according to claim 1, wherein the support extends substantially along the length of the ceramic filter.

13. A ceramic filter arrangement according to claim 5, wherein the support and/or the secondary support element comprises a metallic material.

14. A ceramic filter arrangement according to claim 1, wherein the ceramic filter and the support are provided in the form of hollow tubes.

15. A ceramic filter arrangement according to claim 1, wherein the ceramic filter is closed at one end.

16. A ceramic filter arrangement according to claim 13, wherein the ceramic filter comprises a radially, outwardly extending flange at the end opposite to the closed end.

17. A ceramic filter arrangement as claimed in claim 1, where the ceramic filter is a non-layered single-piece construction.

18. A method for providing a supported ceramic filter arrangement, which comprises the steps of:
  a. providing a rigid and self-supporting ceramic filter;
  b. providing a support, wherein the support comprises a knuckle for making contact with an inside wall of the ceramic filter and wherein the diameter of the support at the knuckles is greater than the diameter of the support above the knuckles; and
  c. providing the support within the ceramic filter so that the support is in contact with inside walls of the ceramic filter.

19. A support for supporting a rigid and self-supporting ceramic filter, the support comprising:
  a plurality of bars, wherein one or more of the bars comprises a free end that is bent inwardly to define an inwardly extending bar section that exhibits spring-like characteristics and a knuckle for making contact with an inside wall of the ceramic filter;
  a plurality of reinforcing elements spaced along and connected to the bars,
  wherein the diameter of the support at the knuckles is greater than the diameter of the support above the knuckles.

20. A support according to claim 19, the support further comprising a secondary support element extending radially from the support for making contact with the inside wall of the ceramic filter, wherein the secondary support element is releasably connectable to the support and is configured to retain the rigid self-supporting ceramic filter if it becomes fractured in use.

* * * * *